US006203917B1

(12) United States Patent
Davis et al.

(10) Patent No.: US 6,203,917 B1
(45) Date of Patent: Mar. 20, 2001

(54) CONFORMABLE POLY (DIMETHYLSILOXNE) COATING AS INTERMEDIATE LAYER FOR FUSER MEMBERS

(75) Inventors: Stephen V. Davis, Rochester; Jiann-Hsing Chen, Fairport; Nataly Boulatnikov, Ontario, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/224,388

(22) Filed: Dec. 31, 1998

(51) Int. Cl.[7] ..................... B32B 15/08

(52) U.S. Cl. ..................... 428/450; 428/36.9; 428/36.91; 428/448; 430/99; 430/126; 492/53; 492/56

(58) Field of Search ..................... 428/36.9, 36.91, 428/447, 448, 450; 430/99, 126; 492/53, 56

(56) References Cited

U.S. PATENT DOCUMENTS

| | | | | |
|---|---|---|---|---|
| 4,672,003 | * | 6/1987 | Letoffe | 428/447 |
| 5,336,539 | * | 8/1994 | Fitzgerald | 428/36.8 |
| 5,534,347 | | 7/1996 | Chen et al. | 428/375 |
| 5,582,917 | | 12/1996 | Chen et al. | 428/421 |

* cited by examiner

*Primary Examiner*—D. S. Nakarani
(74) *Attorney, Agent, or Firm*—Doreen M. Wells

(57) ABSTRACT

A fuser member having a support metallic core and a layer of material formed over the metallic core, an intermediate layer, and an outer layer, the intermediate layer including a cross-linked poly(dialkylsiloxane); one or more multifunctional silanes; one or more amino functional silane crosslinking agents; catalyst; and optional fillers.

15 Claims, No Drawings

CONFORMABLE POLY (DIMETHYLSILOXNE) COATING AS INTERMEDIATE LAYER FOR FUSER MEMBERS

FIELD OF THE INVENTION

The present invention relates generally to the field of fuser members useful in electrophotographic copying and in particular to an intermediate layer for a fusing member which provides high image quality and processability.

BACKGROUND OF THE INVENTION

A widely used method for affixing toner materials to a receiver sheet is by the application of high temperature and pressure in the fusing subsystem of a photocopying machine. A common configuration for a fusing subsystem is to place a pair of cylindrical rollers in contact. The roller that contacts the side of the receiver sheet carrying the unfixed or unfused toner is known as the fuser roller. The other roller is known as the pressure roller. The area of contact is known as the nip.

A toner receiver sheet containing the unfixed or unfused toner is passed through the nip. A soft coating on one or both of the rollers allows the nip to increase in size relative to the nip which would have been formed between two hard rollers and allows the nip to conform to the receiver sheet, improving the fusing quality. Typically, one or both of the rollers are heated, either through application of heat from the interior of the roller or through external heating. A load is applied to one or both rollers in order to generate the higher pressures that are necessary for good fixing or fusing of the toner to the receiver sheet.

The application of high temperature and pressure as the receiver sheet passes through the nip causes the toner material to flow to some degree, increasing its contact area with the receiver sheet. If the cohesive strength of the toner and the adhesion of the toner to the receiver sheet is greater than the adhesion strength of the toner to the fuser roller, complete fusing occurs. However, in certain cases, the cohesive strength of the toner or the adhesion strength of the toner to the receiver is less than that of the toner to the fuser roller. When this occurs, some toner will remain on the roller surface after the receiver sheet has passed through the nip, giving rise to a phenomenon known as contamination. Contamination can also occur on the pressure roller.

In order to achieve desired image quality with respect to gloss, the surface properties of the roller are paramount. This is also true of an overcoated roller. The base cushion surface properties can affect the final, outer surface properties of the fuser member and therefore affect image quality.

There are two possible methods of making suitable fuser members. The first is to mold the fuser member or the fuser member base cushion. The advantage of this is that the surface properties of the fuser member or base cushion can be controlled by the quality of the mold surface. The disadvantage of this process is that a molded part will generally have problems associated with resin shrinkage and centering of the roller in the mold. The problems occur when the material is not perfectly centered on the roller. This results in paper handling problems as well as the possibility of an uneven nip. An uneven nip results in nonuniform fusing quality and gloss.

Multilayer rollers have been described to impart properties such as an oil barrier layer as described in U.S. Pat. No. 5,968,704, issued Oct. 19, 1999 and adhesion as in U.S. Pat. No. 5,534,347. Another role for an intermediate layer may be to separate two incompatible materials such as an addition cured from a condensation cured silicone as in U.S. Pat. No. 5,968,704, issued Oct. 19, 1999.

The second method for making a suitable fuser member is to coat an intermediate layer over a ground roller surface. This allows the tight control of the dimensional tolerance. In order to be able to produce a fuser member for a high quality image with desirable image characteristics such as gloss. One criterion is that the intermediate layer must be able to fill in all the pores of the ground surface. Another criterion is that the process should proceed quickly.

One difficulty in obtaining consistent high image quality with ground fuser roller material is that any roughness or variability in the grinding method and wheel, or the occurrence of a high frequency pattern from grinding, becomes apparent in the final image and this is undesirable. Intermediate layers have been mentioned as a method to control surface finish but they have not been described in detail.

There is a need for improved fuser members with improved fusing performance, e.g. increased coating quality to produce improved image characteristics without reducing the toner releasability, fuser member processability, temperature control, or dimensional tolerances.

SUMMARY OF THE INVENTION

It is an object of the present invention to provide a fuser member intermediate layer to improve image quality.

In accordance with the present invention there is provided a fuser member having a support metallic core and a layer of material formed over the metallic core which can be ground to yield tight mechanical tolerances, one or more intermediate layers, and an outer layer. One intermediate layer being to affect surface properties, this layer comprising:

(a) a crosslinkable poly(dialkylsiloxane), wherein the poly(dialkylsiloxane) has a weight average molecular weight before crosslinking above 5,000;

(b) one or more multifunctional silanes;

(c) one or more amino functional silane crosslinking agents;

(d) optional fillers.

An advantage of the present invention is that by application of the intermediate layer, the surface properties, primarily roughness, of the outer layer of the fuser member can be improved.

Another advantage is that by improving the surface properties of the fuser member outer layer, the fusing temperature can be reduced while maintaining image quality requirements.

Another advantage of the current invention is that the intermediate layer successfully improves the surface properties of the fuser member outer layer thus allowing the base cushion to be ground to mechanical tolerances without loss of image characteristics.

Another advantage of the present invention is that the surface properties of the outer layer of the fuser member are improved without significantly affecting processing time.

Another advantage of the present invention is that the image characteristics can be improved at a lower temperature resulting in lower contamination.

Another advantage of the present invention is that the image characteristics can be improved at a lower temperature resulting in lower contamination below the advantage observed by molding the fuser member.

Another advantage of the present invention is that the low hardness of the poly(dialkylsiloxane) results in a more conformable coating resulting in reduced contamination.

DETAILED DESCRIPTION OF THE INVENTION

The intermediate layer of the fuser member of the invention includes a crosslinkable poly(dialkylsiloxane). The optional fillers are an oxide or mixture of oxides. Typical oxides include metal oxides such as aluminum oxide, iron oxide, tin oxide, zinc oxide, copper oxide and nickel oxide. Silica (silicon oxide) can also be used. Other fillers may be added for yield other properties. One such filler is a silicone T-resin which can improve solution shelf life. However to realize the full advantages of the present invention the total filler concentration should be limited to 55 wt % of the total weight of the mixture.

Silanol-terminated poly(dialkylsiloxane) polymers and methods of their preparation are well known. They are readily commercially available, e.g., from Huls America, Inc., (United Chemical) 80 Centennial Ave., Piscataway, N.J., U.S.A., and having the repeat unit structure:

Structure 1

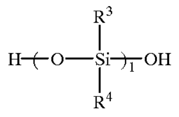

For purpose of the present invention 1 is an integer such that the Structure (I) polymer has a weight average molecular weight above 5,000 i.e., 1 is between 60 and 1,300 when $R^3$ and $R^4$ are both methyl. $R^3$ and $R^4$ are independently alkyl groups such as methyl, ethyl, propyl, butyl, pentyl, or hexyl. If the molecular weight were below 5,000, the final cross-linked poly(dialkylsiloxane) would have a high crosslink density that would make the material too hard and brittle, and not resilient enough to serve practically as an intermediate layer.

The poly(dialkylsiloxane) polymers can be cross-linked with multifunctional silanes. The multifunctional silanes that can serve as crosslinking agents for the Structure (I) polymers arc well known for this purpose. Each of such silanes comprises a silicon atom bonded to at least three groups that are functional to condense with the hydroxy end groups of the Structure (I) polymers to thereby create siloxane crosslinks through the silicon atom of the silane. The functional groups of the silanes can be, for example, acyloxy (R—COO—), alkenoxy ($CH_2$=C(R)O—), alkoxy (R—O—), dialkylamino ($R_2$N—), or alkyliminoxy ($R_2$C=N—O—) groups, wherein R represents an alkyl moiety. Some specific examples of suitable multifunctional silane crosslinking agents are methyltrimethoxysilane, tetraethoxysilane, methyltripropenoxysilane, methyltriacetoxysilane, propyltrimethoxysilane, methyltris (butanone oxime)silane, and methyltris(diethylamino) silane. A preferred silane crosslinking agent is polyethylsilicate (condensed tetraethylorthosilicate).

In the case where alkoxy functional groups are employed, the condensation crosslinking reaction is carried out with the aid of a catalyst, such as, for example, a titanate, chloride, oxide, or carboxylic acid salt of zinc, tin, iron, or lead. Some specific examples of suitable catalysts are zinc octoate, dibutyltin diacetate, ferric chloride, and lead dioxide.

The primary crosslinkable poly(dialkylsiloxane) material used for the Examples and Comparative Examples is LS4340, obtained from Grace Specialty Polymers, Massachusetts. LS4340 is the precursor to Stycast® 4952 before addition of the aluminum oxide. Stycast® 4952 is composed of a network-forming polymer that is a silanol-terminated (α-ω-hydroxy-) poly(dimethylsiloxane). The number of repeat units is such that the silanol-terminated poly (dimethylsiloxane) (α-ω-dihydroxypolydimethyl siloxane has a weight average molecular weight of from 5,000 to 80,000. This composition includes the filler. The filler is between 55–70 wt % aluminum oxide and 5–15 wt % iron oxide particulate fillers. Polyethylsilicate is present as the crosslinking agent. All weight percentages herein refer to weight precentage based on the entire weight of the mixture.

Specific examples of useful catalysts for this polymer are dibutyltin diacetate, tin octoate, zinc octoate, dibutyltin dichloride, dibutyltin dibutoxide, ferric chloride, lead dioxide, or mixtures of catalysts such as CAT50®. (sold by Grace Specialty Polymers, Massachusetts). CAT50® is believed to be a mixture of dibutyltin dibutoxide and dibutyltin dichloride diluted with butanol.

In addition to the multifunctional silane described above one or more aminofunctional silanes are also added. Each of such aminofunctional silanes comprises a silicon atom bonded to at least one group that is functional to condense with the hydroxy end groups of the Structure (I) polymers to thereby create chemical bonds through the silicon atom of the silane. Also the silicon atom is bonded to at least one group that contains a primary amino, $NH_2$, or secondary, NH— group. The role of the aminofunctional silane is to promote rapid drying of the intermediate layer. The aminofunctional silanes useful is represented by the following structure:

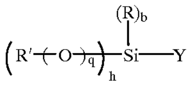

Where R can be an alkyl group having 1 to 7 carbon atoms, R' can be an alkyl group having 1 to 7 carbon atoms or a polyalkoxyalkyl group of less than 7 carbon atoms; Y is an amino group or an amino substituted alkyl, or a poylaminosunstituted alkyl or an alkenylalkoxy amino or an aryl amino group of less than 15 carbon atoms and h is 1 to 3, b is 0 to 2, q is 1 or 2 and h+b=3. Specific example of such aminofunctional silanes 3-aminopropyltrimethoxy silane, 3-aminopropyldiethoxymethoxysilane, 3-aminopropyl triethoxysilane, 3-aminopropylethoxydimethoxysilane, and m,p-(aminoethylaminomethyl)phenyltrimethoxysilane.

The aminofunctional silane is present in an amount of 0.3 to 15 parts based on 100 parts of poly(dialkylsiloxane).

For one preferred embodiment, the various components of the intermediate layer material can have the following weight percentages a) 37–95 wt % α-ω-hydroxy-poly(dialkyl siloxane) having a weight average molecular weight above 5,000

(b) 0–55 wt % fillers;

(c) 0.5–5 wt % crosslinking agent;

(d) 0.3 to 15 parts aminofunctionilized silane based on 100 parts of poly(dialkylsiloxane); and (e) 0.01–2 wt % catalyst.

The catalyst concentration is chosen to yield a tough material with reasonable processing time. In the event of choosing a lower reactivity catalyst, then more than 2 weight percent catalyst can be useful.

To form the intermediate layer of a fuser member in accordance with the invention, a slight excess of the stoichiometric amount of multifunctional silane to form crosslinks with all the hydroxy end groups, and the appropriate amount of filler are thoroughly mixed on a three-roll mill. The mix is then dissolved in a suitable solvent such as methylethylketone (MEK). The amino functional silane and the catalyst are then added to the solution with thorough stirring. The material can then be ring coated or preferably due to the rapid drying of this material through the incorporation of the amino functional silane, the material can be transfer coated.

The intermediate layer described in the present invention can be used in conjunction with an oil barrier layer in the event of the outer layer being swellable by the release fluid. An oil-barrier layer can be obtained by coating an underlying silicone elastomer, coated directly or indirectly on a cylindrical core, with a composition formed by compounding a mixture comprising a fluorocarbon copolymer, a fluorocarbon-curing agent, a curable polyfunctional poly(C $_{(1-6)}$ alkyl)phenylsiloxane polymer, one or more fillers and an accelerator for promoting crosslinking between the curing agent and the fluorocarbon copolymer as described in commonly assigned U.S. Pat. No. 5,534,347. Other candidates for oil barrier layer include most heat stable materials having no poly(dimethylsiloxane) oil swell.

The rollers produced in accordance with the present invention are thus useful in electrophotographic copying machines to fuse heat-softenable toner to a substrate. This can be accomplished by contacting a receiver, such as a sheet of paper, to which toner particles are electrostatically attracted in an imagewise fashion with such a fusing member. Such contact is maintained at a temperature and pressure sufficient to fuse the toner to the receiver.

EXAMPLES

The following examples are presented for a further understanding of the invention.

Example 1

A fuser roller was prepared by blade coating Stycast® 4952 on an aluminum core. The roller was air cured 4 hours at 25° C. The roller was then cured with a 12 hour ramp to 200° C. followed by an 18 hour hold at 200° C. A solution was prepared of the following: 62.5 percent solids of 100 parts LS4340 obtained from Emerson and Cumings (being Stycast® 4952 without the addition of the aluminum oxide filler), 0.5 parts CAT50® in methylethylketone. This solution was then coated on the described roller and air dried overnight. The roller was then tested for roughness.

Example 2

A fuser roller was prepared as in Example 1. The roller was then ring coated with the material described in U.S. Pat. No. 5,582,917 (Material A). The roller was then cured according to U.S. Pat. No. 5,582,917 then tested by Engineering Machine Test 2.

Example 3

A fuser roller was prepared as in Example 1. The roller was then transfer coated with the material described in U.S. Pat. No. 5,582,917 (Material B). The roller was then cured according to U.S. Pat. No. 5,582,917 then tested by Engineering Machine Test 2.

Example 4

A solution was prepared of the following: 62.5 percent solids of 100 parts LS4340 and 0.5 parts CAT50®. in methylethylketone. To this solution 6.4 parts 3-aminopropyltrimethoxysilane obtained from Aldrich Chemical Company was added. This solution was then coated on 2 mil Kapton®. The time for the overcoated layer to dry tack-free was then measured. The solution was checked periodically to determine its useful shelf life.

Example 5

A solution was prepared of the following: 62.5 percent solids of 100 parts LS4340, 10 parts 3-aminopropyltrimethoxysilane obtained from Aldrich Chemical Company, 20 parts TosPearl 145 (being a silicone T-resin) obtained from GE silicones, 0.5 parts CAT50®. in methylethylketone. This solution was then coated on 2 mil Kapton®. The time for the overcoated layer to dry tack-free was then measured. The solution was checked periodically to determine its useful shelf life.

Example 6

A solution was prepared of the following: 62.5 percent solids of 100 parts LS4340, 2 parts m,p-(aminoethylaminomethyl)phenyltrimethoxysilane, 0.25 parts CAT50®. in methylethylketone. This solution was then coated on 2 mil Kapton®. The time for the overcoated layer to dry tack-free was then measured. The solution was checked periodically to determine its useful shelf life.

Comparative Example 1

A fuser roller was prepared by blade coating Stycast® 4952 on an aluminum core. The roller was air cured 4 hours at 25° C. The roller was then cured with a 12 hour ramp to 200° C. followed by an 18 hour hold at 200° C. The roller was then tested for roughness.

Comparative Example 2

A fuser roller was prepared by injection molding Stycast® 4952 on an aluminum core. The roller was air cured 2 hours at 80° C. then demolded. The roller was then cured with a 12 hour ramp to 200° C. followed by an 18 hour hold at 200° C. The roller was then tested for roughness.

Comparative Example 3

A fuser roller was prepared as in Comparative Example 1. The roller was then ring coated with the material described in U.S. Pat. No. 5,582,917 (Material A). The roller was then cured according to U.S. Pat. No. 5,582,917 then tested by Engineering Machine Test 1.

Comparative Example 4

Two fuser rollers were prepared as in Comparative Example 2. The rollers were then ring coated with the material described in U.S. Pat. No. 5,582,917. The roller was then cured according to U.S. Pat. No. 5,582,917 (Material A) then tested by both Engineering Machine Test 1 and Engineering Machine Test 2.

Comparative Example 5

A fuser roller was prepared as in Comparative Example 1. The roller was then transfer coated with the material described in U.S. Pat. No. 5,582,917 (Material B). The roller was then cured according to U.S. Pat. No. 5,582,917 then tested by Engineering Machine Test 2.

Comparative Example 6

A fuser roller was prepared as in Comparative Example 2. The roller was then transfer coated with the material described in U.S. Pat. No. 5,582,917 (Material B). The roller was then cured according to U.S. Pat. No. 5,582,917 then tested by Engineering Machine Test 2.

Comparative Example 7

A solution was prepared of the following: 62.5 percent solids of 100 parts LS4340, 0.5 parts CAT50®. in methylethylketone. This solution was then coated on 2 mil Kapton®. The time for the overcoated layer to dry tack-free was then measured. The solution was checked periodically to determine its useful shelf life.

Comparative Example 8

A solution was prepared of the following: 62.5 percent solids of 100 parts LS4340, 10 parts tetraethylorthosilicate obtained from Aldrich Chemical Company, 0.5 parts CAT50®. in methylethylketone. This solution was then coated on 2 mil Kapton®. The time for the overcoated layer to dry tack-free was then measured. The solution was checked periodically to determine its useful shelf life.

Comparative Example 9

A solution was prepared of the following: 62.5 percent solids of 100 parts LS4340, 10 parts phenyltrimethoxysilane obtained from Aldrich Chemical Company, 0.5 parts CAT50®. in methylethylketone. This solution was then coated on 2 mil Kapton®. The time for the overcoated layer to dry tack-free was then measured. The solution was checked periodically to determine its useful shelf life.

Comparative Example 10

A solution was prepared of the following: 62.5 percent solids of 100 parts LS4340, 10 parts phenyltrimethoxysilane, 10 parts tetraethylorthosilicate, 20 parts TosPearl 145, 0.5 parts CAT50®. in methylethylketone. This solution was then coated on 2 mil Kapton®. The time for the overcoated layer to dry tack-free was then measured. The solution was checked periodically to determine its useful shelf life.

Comparative Example 11

A solution was prepared of the following: 62.5 percent solids of 100 parts LS4340, 0.25 parts CAT50®. in methylethylketone. This solution was then coated on 2 mil Kapton®. The time for the overcoated layer to dry tack-free was then measured. The solution was checked periodically to determine its useful shelf life.

Material Testing

Drying Time and Shelf Life

The drying time was measured by monitoring the coated Kapton film until the coating was dry to the touch. Shelf life was determined by monitoring the solution until it gelled.

Roughness and Surface Properties

The Roughness, Ra, and surface properties were measured on a Federal 2000 surfanalyzer with a chisel tip.

Engineering Machine Testing 1

The first machine testing using a modified Kodak #### copier printer. The copier/printer had been modified to accept an external fuser assembly to form an engineering breadboard. A polyester toner was loaded into the copier/printer for this test. The external fuser assembly consisted of a frame to support a fuser and pressure roller, an oiling device to apply poly(dimethylsiloxane) oil to the fuser roller in an approximate amount of 10 mg of poly(dimethylsiloxane) oil per 8.5"×11" page, a cleaning web to remove an collect toner offset from the fuser roller. The fuser rollers described above were placed in this fusing assembly to be tested for gloss-temperature profiles.

Engineering Machine Test 2

The second machine test was performed on an engineering breadboard similar to that described for Engineering Machine Test 1. The only difference being that for test the external fusing assembly had been attached to a Ricoh 5206 print engine. A prototype polyester toner was placed into the toning stations of the Ricoh print engine representing each of the four basic colors cyan, magenta, yellow, and black. Eight stripes of toner were electrostatically bound to the receiver for this analysis. The stripes were varying toner densities for each of the four colors. The chosen toner laydown densities were 1 mg/cm$^2$ hereafter referred to as $D_{max}$ and 0.5 mg/cm$^2$ hereafter referred to as $D_{min}$. Both Dmax and $D_{min}$ toner laydowns were confirmed gravimetrically. For this test a constant fusing temperature of 330° F. was chosen to measure gloss and contamination. To collect sufficient contamination to measure the cleaning web was held stationary during the fusing of 50 toned sheets of 8.5"×11" paper. A constant oil rate of approximately 15 mg of poly(dimethylsiloxane) oil per 8.5"×11" page was chosen. The results of this test are summarized in Table 3 where the following abbreviations are used:

CG—Average gloss of the cyan $D_{max}$ strip
MG—Average gloss of the magenta $D_{max}$ strip
YG—Average gloss of the yellow $D_{max}$ strip
BG—Average gloss of the black $D_{max}$ strip
CC—Average contamination of the cyan $D_{min}$ strip
MC—Average contamination of the magenta $D_{min}$ strip
YC—Average contamination of the yellow $D_{min}$ strip
BC—Average contamination of the black $D_{min}$ strip

Gloss

For analysis of the Engineering Machine Test, a Gardner 20° an gle gloss meter was used to measure the gloss. For gloss measurements the toner laydown was 1 mg/cm2 on the receiver.

Contamination

The contamination was measured by collecting the cleaning web described above and measuring its toner concentration on a reflection densitometer. For contamination measurement the cleaning web was held in one position for 50 8.5"×11" sheets.

The results are shown in the following tables:

TABLE 1

| Sample | Roughness |
|---|---|
| E1 | 4 |
| CE1 | 118 |
| CE2 | 18 |

TABLE 2

| Sample | Gloss (G20) | Temperature |
|---|---|---|
| CE3 | 6 | 380 |
| CE4 | 5 | 300 |

TABLE 3

| Sample | CG | CC | MG | MC | YG | YC | BG | BC |
|---|---|---|---|---|---|---|---|---|
| E2 | 4.8 | 0.09 | 5.0 | 0.12 | 4.9 | 0.12 | 6.1 | 0.13 |
| E3 | 8.2 | 0.05 | 8.1 | 0.06 | 8.4 | 0.12 | 10.3 | 0.07 |
| CE4 | 4.8 | 0.30 | 4.4 | 0.23 | 5.5 | 0.19 | 5.4 | 0.19 |
| CE4 | 8.4 | 0.16 | 7.8 | 0.14 | 7.9 | 0.17 | 8.5 | 0.12 |
| CE5 | 6.5 | 0.16 | 6.6 | 0.11 | 6.7 | 0.15 | 7.0 | 0.15 |

TABLE 4

| Sample | Tack-free time (min) | Solution shelf life (hours) |
|---|---|---|
| E4 | 1 | 18 |
| E5 | 2 | 16 |
| E6 | 5 | 4 |
| CE7 | 960 | >48 |
| CE8 | 240 | 15 |
| CE9 | 50 | 3 |
| CE10 | 55 | 16 |
| CE11 | >8640 | >48 |

Results

Looking first to Table 1, a molded base cushion (CE3) has a dramatically lower roughness than the ground base cushion (CE2) and the ground base cushion coated with the material of this invention (E1) has by far the lowest roughness.

Looking next to Table 2 which displays the results from Engineering Machine Test 1, Comparative Example 3 and Comparative Example 4 show the advantage of reduced base cushion roughness on the gloss and fusing temperature.

Looking next to Table 3 for both fuser roller coating the presence of the fuser intermediate layer of this invention significantly decreases the contamination compared to coating the comparative material on either a ground or molded base cushion.

Although both CE3 and CE5 were both ground, the difference between the glossing characteristics is due to a difference in the fuser member overcoat (Material A versus Material B).

The examples and comparative example demonstrate that use of the intermediatle layer described by this invention decrease the roughness of the fuser member base cushion and lead to a lower fusing temperature without detrimentally affecting processability. Further it is demonstrated that superior toner release properties were obtained.

The invention has been described with particular reference to preferred embodiments thereof but it will be understood that variations and modifications can be effected within the spirit and scope of the invention.

What is claimed is:

1. A fuser member having, in order, a support metallic core and a layer of material formed over the metallic core; an intermediate layer; and an outer layer; wherein the intermediate layer is a material comprising:

(a) a crosslinkable poly(dialkylsiloxane);

(b) one or more multifunctional silanes; and (c) one or more amino functional silane crosslinking agents comprising a silicon atom that is bonded to at least one group that contains a primary amino or secondary amino group.

2. The fuser member of claim 1 wherein the crosslinkable poly(dialkylsiloxane) is poly(dimethylsiloxane).

3. The fuser member according to claim 1, wherein the crosslinkable poly(dialkylsiloxane), is an (α-ω-hydroxy-) poly(dialkylsiloxane).

4. The fuser member according to claim 1, wherein the crosslinkable poly(dialkylsiloxane) has a weight average molecular weight before crosslinking above 5,000.

5. The fuser member according to claim 1, wherein the crosslinkable poly(dialkylsiloxane) has the general structure:

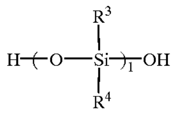

where 1 is an integer between 60 and 1,300 when $R^3$ and $R^4$ are both methyl; $R^3$ and $R^4$ are independently alkyl groups selected from the group consisting of methyl, ethyl, propyl, butyl, pentyl, and hexyl.

6. The fuser member according to claim 3 wherein the multifunctional silane crosslinking agent is a polyethylsilicate crosslinking agent.

7. The fuser member according to claim 1 wherein the material of the intermediate layer further comprises a filler selected from the group consisting of aluminum oxide, iron oxide, tin oxide, zinc oxide, copper oxide, nickel oxide, and silicon oxide.

8. A fuser member having a support metallic core and a layer of material formed over the metallic core, an intermediate layer, and an outer layer, wherein the intermediate layer is a material comprising:

(a) a crosslinkable poly(dialkylsiloxane), wherein the poly(dialkylsiloxane) has a weight average molecular weight before crosslinking above 5,000;

(b) a silane crosslinking agent; and (c) one or more amino functional silane crosslinking agents being present in an amount less than 15 parts based on 100 parts of poly(dialkylsiloxane); the amino functional silane comprises a silicon atom that is bonded to at least one group that contains a primary amino or secondary amino group and is represented by the following structure:

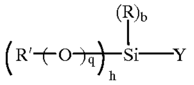

where R is an alkyl group having 1 to 7 carbon aroms, R' is an alkyl group having 1 to 7 carbon atoms or a polyalkoxyalkyl group of less than 7 carbon atoms; Y is an amino group or an amino substituted alkyl group, or a polyaminosubstituted alkyl or an alkenylalkoxy amino or an aryl amino group of less than 15 carbon atoms, and h is 1 to 3, b is 0 to 2, q is 1 or 2 and h+b=3.

9. The fuser member of claim 8 wherein the crosslinkable poly(dialkylsiloxane) is poly(dimethylsiloxane).

10. The fuser member of claim 1 or 8 wherein the intermediate layer further comprises an oxide filler present in an amount less than 55% by weight based on the total weight of the components of the intermediate layer material.

11. The fuser member according to claim 1 or 8 wherein amino functional silane crosslinking agents are present in an amount of from about 0.3 to 15 parts per 100 parts of crosslinkable poly(dialkylsiloxane).

12. The fuser member according to claim 1 or 8 wherein the fusing member is a fuser roller or a pressure roller.

13. The fuser member according to claim 8 further including an oil barrier layer disposed between the support metallic core and the outer layer.

14. The fuser member according to claim 13 further includes a cushion layer disposed between the oil barrier layer and the support metallic core.

15. The fuser member according to claim 1 or 8 further including a cushion layer disposed between the support metallic core and the intermediate layer.

* * * * *